Oct. 13, 1953  C. ANAYA MARTINEZ  2,655,330
MOUNTING FOR PICTURES, MIRRORS, AND THE LIKE
Filed Feb. 26, 1951
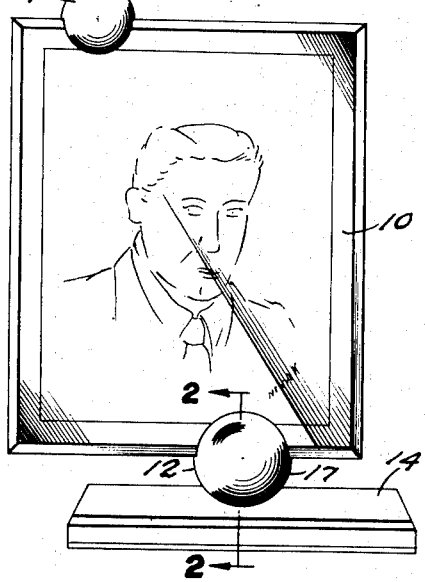
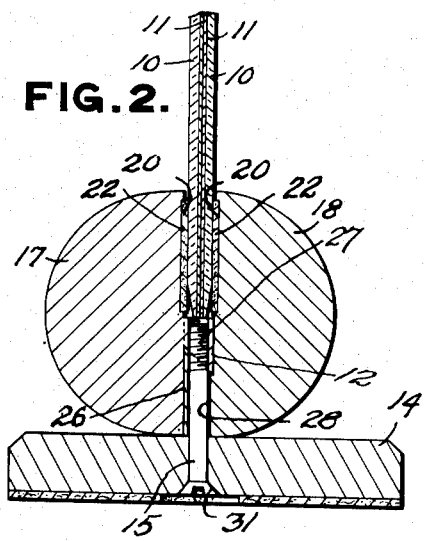
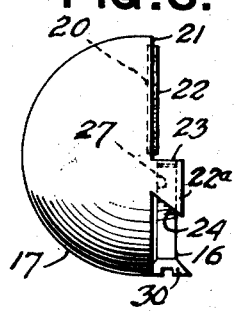
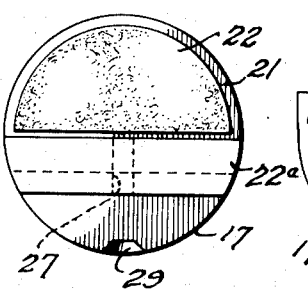
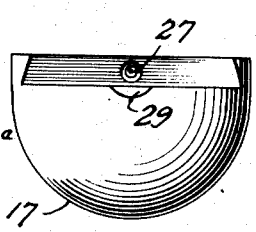
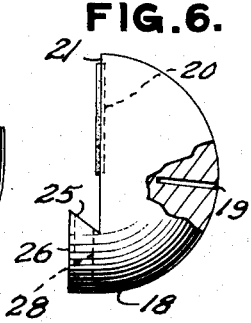
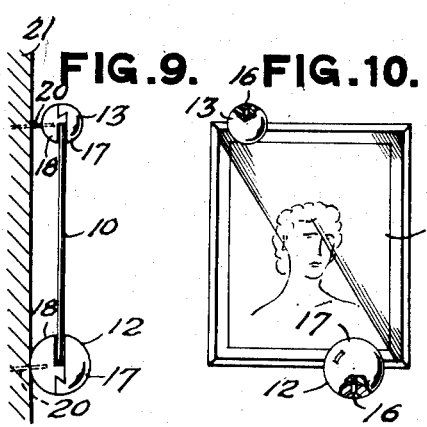
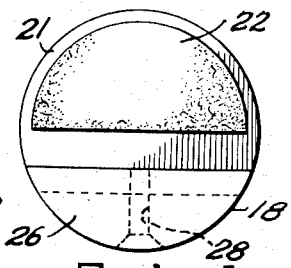
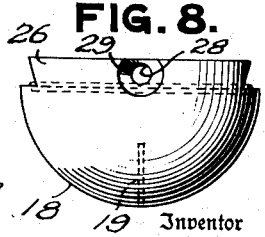
Inventor
Carlos Anaya Martinez
By
Attorneys Patented Oct. 13, 1953

2,655,330

UNITED STATES PATENT OFFICE 2,655,330

MOUNTING FOR PICTURES, MIRRORS, AND THE LIKE

Carlos Anaya Martinez, Mexico City, Mexico

Application February 26, 1951, Serial No. 212,819
In Mexico December 18, 1950

1 Claim. (Cl. 248—28)

This invention relates to a mounting for pictures, mirrors and the like adaptable for resting on a horizontal surface or for wall mounting and has for an object to provide novel forms of mounting elements which are susceptible of being incorporated in various shapes of artistic or ornamental design.

Another object is to provide such mounting elements which will clamp on a pane of glass such as a mirror or a pair of glass panes for mounting and protecting a picture between them, whereon such pieces of glass may have beveled edges and are so held by the supporting elements that the photograph is supported by and substantially sealed between them.

Another object is to provide such means for mounting the glass pane or panes in an upright position from a base element for resting on a horizontal surface such as a table and also to provide them with pin holes extending rearwardly for receiving pins extending from an upright wall surface for hanging or supporting them.

An object is to provide such mounting elements comprising a pair of opposed cushioned surface pane engaging elements and interengaging wedging elements with a single upright assembly screw acting upon the wedging elements in a manner to draw the parts into ripping engagement with a glass pane such as a mirror or display pane or a pair of glass panes which may have conventionally beveled edges for mounting pictures. Such mounting elements as shown in the drawings are spheroidal in shape, as a highly satisfactory form of ornamental design, though in practice other shapes of artistic design are susceptible for use in accordance with my invention.

Further objects and details of my invention will appear in the following description supplemented by the accompanying drawings, forming a part of this specification.

Referring to the drawings:

Figure 1 is a perspective view of a picture support embodying the features of my invention.

Figure 2 is an enlarged vertical sectional view taken on line 2—2 of Figure 1.

Figures 3, 4 and 5 are, respectively, a side elevation, face elevation and bottom plan view of one of the pair of mounting elements.

Figures 6, 7 and 8 are corresponding side and face elevation bottom plan views of the other of the pair of mounting elements.

Figures 9 and 10 are side and front elevations of a picture supporting means in accordance with my invention for mounting on a wall.

Referring to the drawings, in general, my invention is shown applied to picture mountings or other panel assemblies as best illustrated in Figures 1 and 10, Figure 1 showing a stand and Figure 10 a wall mounting. In both arrangements a pair of glass panes 10, conventionally beveled, encase photographs 11 or the like and are pressed into engagement by lower and upper mounting members 12 and 13 respectively. These members, as above mentioned, are spheroidal in shape and while they may be of different sizes, the upper one being shown as smaller than the lower one for better balancing the picture and the sake of appearance, they are mechanically the same so the construction of the lower member 12 only is illustrated in Figures 2 to 8 inclusive and described.

As shown in Figure 1 and in detail in Figure 2, the lower mounting member 12 is mounted on a base 14 which may be rectangular as shown or any other conventional construction and shape. It will be noted that in this arrangement an assembly screw 15 is employed which performs a dual function of holding the mounting member elements assembled, as will be described, and for holding the mounting member 12 on the base 14.

When the mounting 12 is not to be secured to such a base, a shorter screw 16, as shown in Figures 3 and 10, is preferably employed for holding companion front and rear elements 17 and 18, respectively, of the mounting members assembled. As best shown in Figures 6, 8 and 9, the rear mounting elements 18 are provided with lateral, rearwardly extending pin holes 19 into which laterally extending wall mounting pins 20 are received for supporting the picture on a wall 21.

A shown in Figures 2 to 8 inclusive, the elements 17 and 18 each have depressions 20 in their glass pane confronting surfaces 21 for the reception of cushioning pads 22 of rubber or other suitable material for gripping engagement with the glass panes 10 for a picture, a mirror or other display glass panel. Front mounting member element 17 has a rearward projection 22a with an upper lateral surface 23 for engaging and supporting edges of glass panes 10 and a lower beveled surface 24 which flares outwardly and downwardly from the main body of the element at an angle of preferably 45°, for cooperating with a complemental beveled surface 25 on a lower projection 26 on the rear mounting member element 18. Projection 22a has an upright screw threaded bore 27 for the receptive engagement of screw 16 (or screw 15) and projection 26 has a complemental bore 28 through which screw 16 may loosely slide. Both elements 17 and 18 are formed with depressions cooperatively providing a countersink 29 for the beveled head 30 of screw 16, in the form shown in Figures 3–10.

The projections 22ª and 26 on the respective elements 17 and 18 are so arranged that when the elements are in clamping arrangement with suitable glass panes 10, or the like, the elements 17 and 18 are positioned to provide a substantially continuous spheroidal surface, that is, when screw 16 draws the projections together and due to the cooperating beveled surfaces 24 and 25, the outer surfaces of the projections are drawn laterally into engagement with the opposed elements 17 and 18. Cushions 22 afford a gripping or clamping action on the opposite sides of glass panes 11, and being yieldable, they permit the use of panes of varying thicknesses.

When the elements 17 and 18 are drawn into glass pane clamping relationship by screw 16, the head 30 of the screw is substantially concealed in the countersink 29. However, when long screw 15 is employed this screw has its head embedded in a countersink 31 in the base 14. In this arrangement it will be seen that when drawn together by the screw 15 the elements 17 and 18 are further guided into place for spherical surface alignment by their engagement with the upper surface of base 14.

It will be seen that in picture mounting, the lower member 12 may be mounted to one side of the central vertical axis of the glass panes while the upper member 13 is mounted to the other side of that axis, or they may be centered, depending on the artistic effect desired.

I claim:

A mounting means for a panel assembly of the character described comprising, the combination of a pair of elements having complemental confronting surfaces for engaging opposite faces of a panel, one of said elements having a projection with an outer face parallel with the plane of the panel engaging surface, said projection having an outwardly extending wall portion substantially at right angles to its panel engaging surface, and against which the edge of the panel assembly is adapted to engage, said projection having an opposite wall extending outwardly from the plane of the panel engaging surface at an acute angle and the element having a surface beyond said projection substantially in the plane of the panel engaging surface; said other element having a projection terminating in a plane parallel with its panel engaging surface at a distance beyond the panel engaging surface the same as the distance of the projection on the aforesaid element from its panel engaging surface and said projection having a wall extending outwardly from the plane panel engaging surface at the same acute angle as the wall of said first mentioned projection so as to be complementary therewith, the opposite wall of the last projection being a continuation of the outer surface of the element, said projections each having a bore beyond and parallel with the planes of the panel engaging surfaces thereof, the bore in the first mentioned projection being of a smaller diameter and screw threaded, and a screw extending through the bore of said second projection and into the threaded bore of said first projection adapted to draw the panel engaging surfaces of the elements toward each other for gripping the panel assembly and maintaining the elements in assembled relationship.

CARLOS ANAYA MARTINEZ.

References Cited in the file of this patent

UNITED STATES PATENTS

| Number | Name | Date |
|---|---|---|
| 125,789 | Clark et al. | Apr. 16, 1872 |
| 155,834 | Haynes | Oct. 13, 1874 |
| 544,501 | Buffington | Aug. 13, 1895 |
| 1,882,879 | Plym | Oct. 18, 1932 |
| 2,195,013 | Rastetter et al. | Mar. 26, 1940 |
| 2,236,888 | Bishop | Apr. 1, 1941 |
| 2,557,399 | Teetor | June 19, 1951 |

FOREIGN PATENTS

| Number | Country | Date |
|---|---|---|
| 18,407 | Great Britain | of 1899 |